(12) United States Patent
Boss et al.

(10) Patent No.: US 10,902,536 B2
(45) Date of Patent: Jan. 26, 2021

(54) COGNITIVE EMERGENCY TASK COORDINATION

(71) Applicant: INTERNATIONAL BUSINESS MACHINES CORPORATION, Armonk, NY (US)

(72) Inventors: Gregory J. Boss, Saginaw, MI (US); Rick A. Hamilton, II, Charlottesville, VA (US); Mary D. Swift, Rochester, NY (US); Edgar A. Zamora Duran, Santo Domingo (CR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 15/622,303

(22) Filed: Jun. 14, 2017

(65) Prior Publication Data
US 2018/0365785 A1    Dec. 20, 2018

(51) Int. Cl.
*G06Q 50/26*      (2012.01)
*G06Q 10/06*      (2012.01)
(Continued)

(52) U.S. Cl.
CPC ... *G06Q 50/265* (2013.01); *G06Q 10/063112* (2013.01); *G06T 19/006* (2013.01);
(Continued)

(58) Field of Classification Search
CPC .......... G06Q 50/265; G06Q 10/063112; G06T 19/006; H04L 67/10
(Continued)

(56) References Cited

U.S. PATENT DOCUMENTS 8,576,066 B2 * 11/2013 Bivens ................ G08B 25/003
                                                      340/539.13
8,862,534 B1 * 10/2014 Faratin ................... G06Q 30/02
                                                            706/50
(Continued)

FOREIGN PATENT DOCUMENTS

EP          2126866       12/2009
WO       2007133209       11/2007

OTHER PUBLICATIONS

Seneviratne et al., Your Installed Apps Reveal Your Gender and More!, Feb. 28, 2015, Mobile Computer Communication Review, 18, p. 2-3.*

(Continued)

*Primary Examiner* — Christine M Behncke
*Assistant Examiner* — James Webb
(74) *Attorney, Agent, or Firm* — Jay Wahlquist; Andrew D. Wright; Roberts Calderon Safran & Cole, P.C.

(57) ABSTRACT

Systems and methods for cognitive emergency task coordination are disclosed. In embodiments, computer-implemented method comprises: receiving, by a computing device, participant data from one or more participant devices; inferring, by the computing device, skills or expertise of one or more available participants based on the participant data; generating, by the computing device, a task list including tasks associated with an emergency; assigning, by the computing device, select participants of the one or more available participants to one or more of the tasks in the task list based on the inferred skills or expertise; and sending, by the computing device, coordination data to the select participants, the coordination data including information regarding the one or more of the tasks assigned to the respective select participants.

20 Claims, 5 Drawing Sheets

Continue to FIG. 3B

(51) Int. Cl.
*G06T 19/00* (2011.01)
*H04L 29/08* (2006.01)

(52) U.S. Cl.
CPC ............ *H04L 67/306* (2013.01); *H04L 67/10* (2013.01); *H04L 67/12* (2013.01)

(58) Field of Classification Search
USPC ........................................................ 705/7.14
See application file for complete search history.

(56) References Cited

U.S. PATENT DOCUMENTS

| | | | |
|---|---|---|---|
| 9,342,976 B2 | 5/2016 | Pfeffer | |
| 2002/0196202 A1* | 12/2002 | Bastian | G02B 27/017 345/8 |
| 2007/0004389 A1* | 1/2007 | Wallace | G06Q 10/06 455/415 |
| 2008/0146895 A1* | 6/2008 | Olson | G08B 21/0453 600/301 |
| 2011/0071880 A1 | 3/2011 | Spector | |
| 2012/0218102 A1* | 8/2012 | Bivens | G08B 25/003 340/539.13 |
| 2014/0025660 A1* | 1/2014 | Mohammed | G06Q 30/0251 707/722 |
| 2017/0091662 A1* | 3/2017 | Sanchez | G06F 16/2465 |

OTHER PUBLICATIONS

Stack Exchange, How do I infer user activities from historical location data and other relevant data, Apr. 15, 2016, Stack Exchange, p. 1-2.*

Anonymous, "Augmented Reality", U.S. Naval Research Laboratory, Information Management and Decision Architectures, Accessed Apr. 27, 2017, 10 pages.

Ackerman et al., "Israeli Army Prepares Augmented Reality for Battlefield Duty", Bloomberg, Aug. 15, 2016, 4 pages.

Anonymous, "Augmented reality systems set to revolutionise battlefield operations", BAE Systems, Newsroom, May 11, 2015, 2 pages.

* cited by examiner

COGNITIVE EMERGENCY TASK COORDINATION

BACKGROUND

The present invention relates generally to emergency management systems and, more particularly, to cognitive emergency task coordination.

The inter-networking of physical devices has lead to the so-called Internet of things (IoT), which can include a variety of interconnected devices such as vehicles, buildings, wearable devices, and other items embedded with electronics, software, sensors, and network connectivity devices. Such IoT devices allow for the collection and exchange of a variety of data.

Emergency responders may presently utilize a number of different communication methods and devices when responding to an emergency situation. Diverse methods of communicating and coordinating emergency responders (e.g., differences in communication between emergency response agencies) has affected overall management of first responders and others in an emergency situation. Mobile communication devices are increasingly utilized to facilitate communication amongst various parties responding to an emergency. Mobile communication devices of first responders may utilize specialized communication channels (e.g., radio channels), conventional telecommunications channels, and/or the internet, for example.

SUMMARY

In an aspect of the invention, a computer-implemented method includes: receiving, by a computing device, participant data from one or more participant devices; inferring, by the computing device, skills or expertise of one or more available participants based on the participant data; generating, by the computing device, a task list including tasks associated with an emergency; assigning, by the computing device, select participants of the one or more available participants to one or more of the tasks in the task list based on the inferred skills or expertise; and sending, by the computing device, coordination data to the select participants, the coordination data including information regarding the one or more of the tasks assigned to the respective select participants.

In another aspect of the invention, there is a computer program product for cognitive emergency task coordination. The computer program product comprises a computer readable storage medium having program instructions embodied therewith. The program instructions are executable by a computing device to cause the computing device to: identify an emergency; gather information associated with the emergency; identify one or more available participants near a site of the emergency, the one or more available participants including first responder participants and non-first responder participants; gather participant data from one or more participant devices; infer skills or expertise of one or more available participants based on the participant data; generate a task list including tasks associated with the emergency based on the information associated with the emergency; assign select participants of the one or more available participants to one or more of the tasks in the task list based on the inferred skills or expertise of the select participants; and send coordination data to the select participants, the coordination data including information regarding the one or more of the tasks assigned to the respective select participants.

In another aspect of the invention, there is a system for cognitive emergency task coordination. The system includes a CPU, a computer readable memory and a computer readable storage medium associated with a computing device; program instructions to identify available remote participants having expertise in a field related to an emergency; program instructions to select a remote participant from the available remote participant; program instructions to assign the remote participant to one or more of tasks in an emergency response task list; program instructions to send coordination data to a participant device of the remote participant, the coordination data including information regarding the one or more of the tasks assigned to the remote participant, wherein the remote participant device is remote from the site of the emergency; program instructions to receive emergency related data from the remote participant device while the remote participating device is remote from the site of the emergency; program instructions to update the task list based on the emergency related data; and program instructions to send updated tasks to one or more available participants at a site of the emergency.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
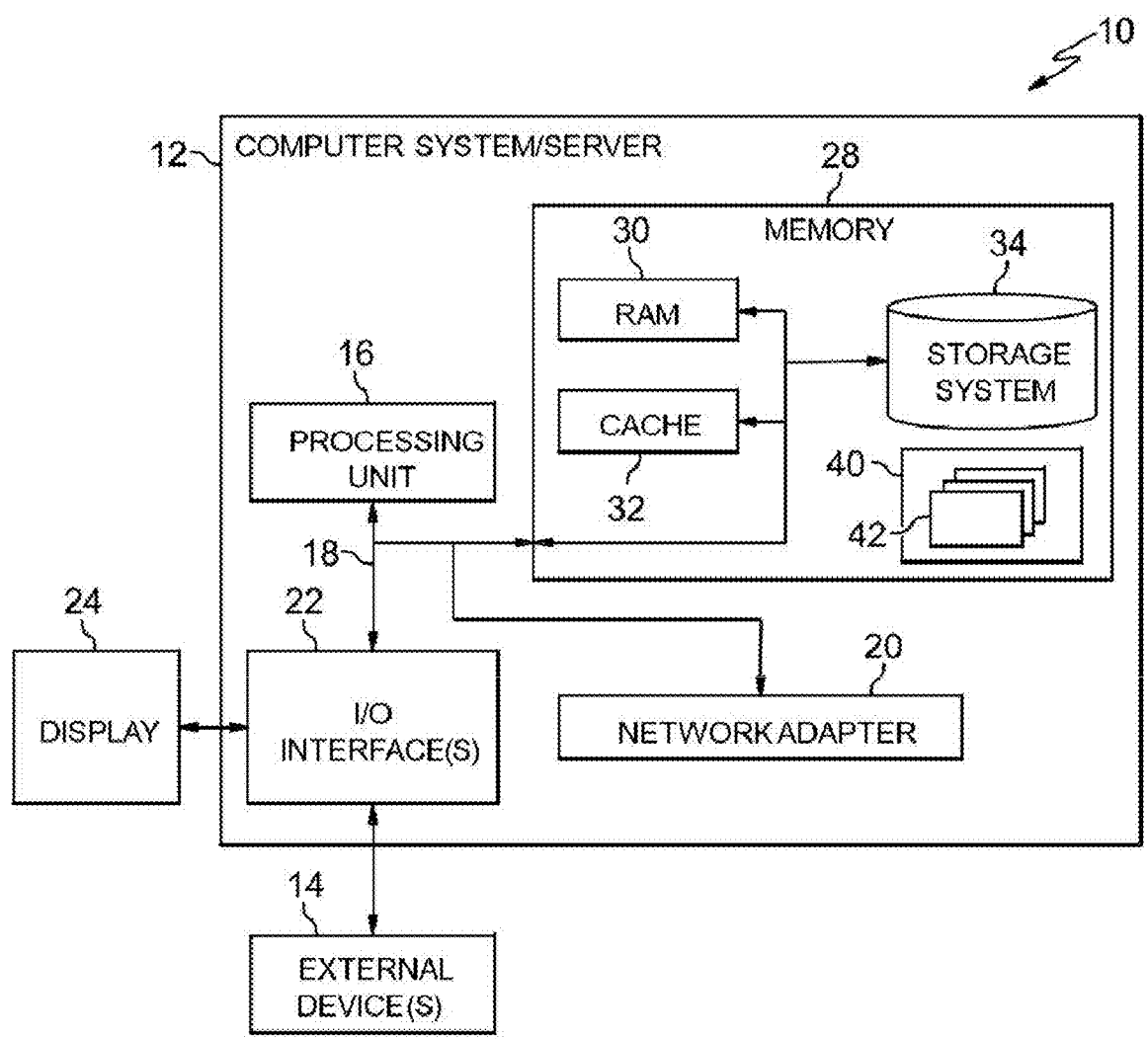
FIG. 1 depicts a computing infrastructure according to an embodiment of the present invention.

The present invention relates generally to emergency management systems and, more particularly, to cognitive emergency task coordination. In emergency situations, first responders rapidly evaluate an emergency situation and make critical decisions about what actions are needed and their urgency. For example, when fire fighters arrive at a burning building, they immediately assess the extent of current fire damage, whether people or animals are trapped inside, and if so, the best path to reach them. In embodiments, augmented reality (AR) devices and internet of things (IoT) sensors are utilized to provide enhanced information to professional and civilian first responders through sensory input such as sound, video and global positioning system (GPS) data. This supplemental information may be utilized by the present invention to display tasks to professional and civilian first responders in order of urgency and assign first responders to a task based on their availability and proximity to the emergency location. In aspects, a task list is continually updated to reflect urgency and status as tasks are completed and new tasks arise. In additional, AR devices can connect a live emergency with first responders in other locations (remote from the emergency) who are available to view the situation and recommend actions/tasks. Thus, local first responders can benefit from global expertise in a given situation.

In embodiments, participant data is gathered from communication devices of first responder (FR) participants (i.e., professional first responders, such as firefighters, paramedics, law enforcement officers, etc.) and non-first responder (NFR) participants (i.e., civilians, good Samaritans or other non-professional first responders or retired professional first responders), and utilized to determine skills or expertise that may be relevant or helpful in addressing an identified emergency situation. In aspects, a task coordination server generates a list of tasks (e.g., actions) to address the emergency situation, whereby FR participants and NFR participants that are determined to be qualified to assist with the emergency situation are assigned one or more of the tasks. The various tasks may then be communicated to respective communication devices of the FR and NFR participants. Updates to the tasks may be generated by the task coordination server on a continuous basis based on real-time data received from on-site participants as well as remote participants (e.g., experts in a field relevant to the emergency situation), and the updated tasks may be sent to the communication devices of the participants.

In embodiments, AR devices and IoT sensors are utilized to dynamically coordinate and prioritize tasks among FR and NFR participants at a site of an emergency. Participant data collected by a task coordination server, as well as emergency location information (e.g., from on-site IoT sensors) collected by the task coordination server, may be utilized to determine the required tasks and assign the tasks to the most suitable and available (e.g., near the emergency cite, qualified to respond, and available to take action) FR and NFR participants.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
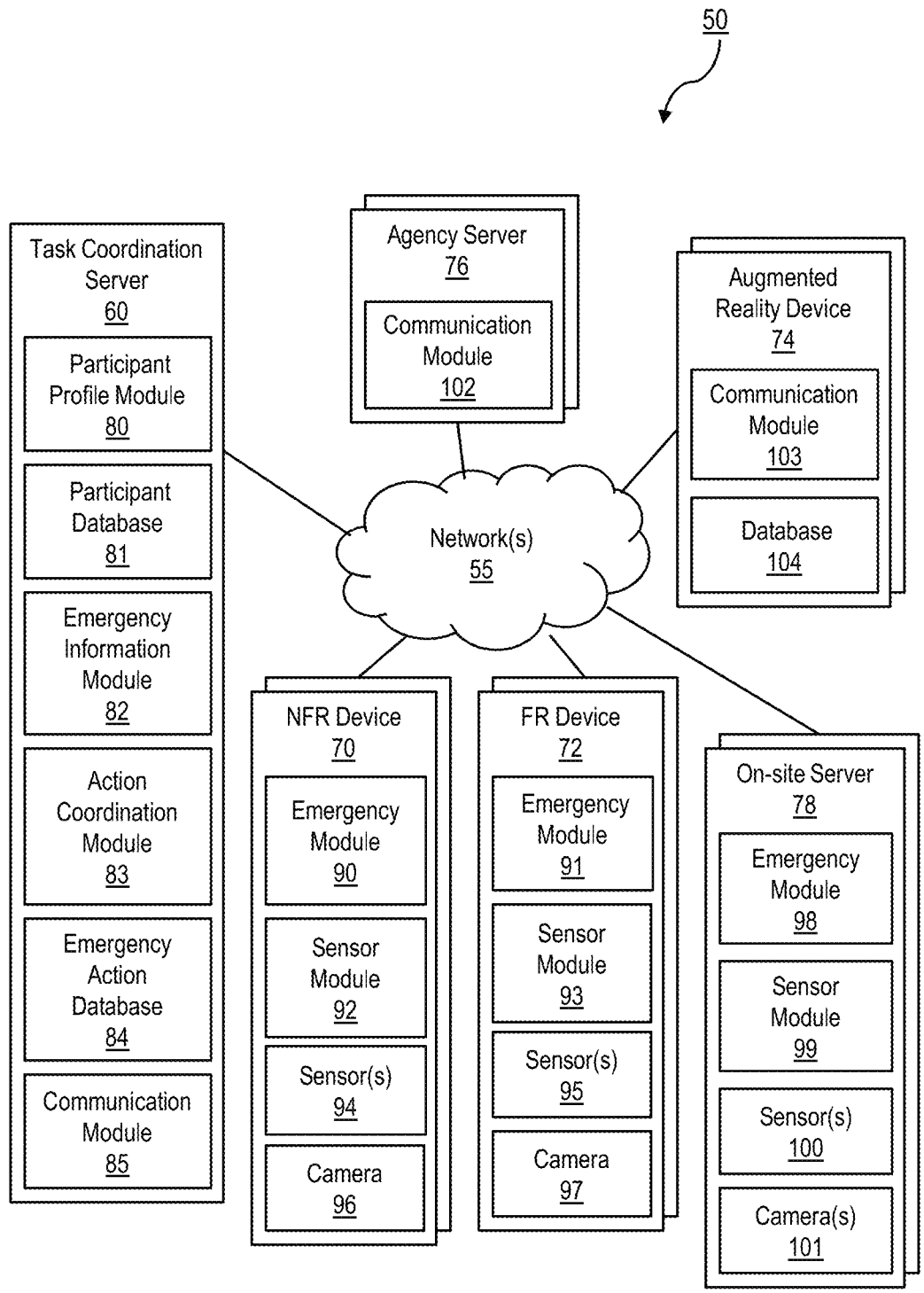
FIG. 2 shows an exemplary environment in accordance with aspects of the invention.

FIG. 2 shows an exemplary emergency management system 50 in accordance with aspects of the invention. The emergency management system 50 includes a task coordination server 60 connected to one or more networks 55. The task coordination server 60 may comprise a computer system 12 of FIG. 1, and may be connected to the one or more networks 55 via the network adapter 20 of FIG. 1. The task coordination server 60 may be configured as a special purpose computing device that is part of the infrastructure of the emergency management system 50. For example, the task coordination server 60 may be configured to coordinate information and tasks among various first responders, civilian volunteers and emergency response or governmental agencies.

The network(s) 55 may be any suitable communication network or combination of networks, such as a local area network (LAN), a general wide area network (WAN), and/or a public network (e.g., the Internet). It should be understood that various networks utilized by first responders may be utilized in accordance with embodiments of the invention. Various entities may be communicatively coupled to the network(s) 55. For example, FIG. 1 shows NFR devices 70, FR devices 72, augmented reality devices 74, agency servers 76, and on-site servers 78 (e.g., servers location at the site or near an emergency) communicatively coupled to the network(s) 55. The FR devices 72 and NFR devices 70 may be devices such as, but not limited to, smartphones, smartwatches, tablet computers, laptop computers desktop computers, two-way radios, two-way pagers, communication systems of vehicles (e.g., ambulances, helicopters, ships and the like) and other communication devices able to communicate with the network(s) 55.

In embodiments, the task coordination server 60 comprises one or more modules configured to perform functions described herein, which may include one or more program modules (e.g., program module 42 of FIG. 1) executed by the task coordination server 60. In embodiments, the task coordination server 60 may include a participant profile module 80 configured to gather and/or infer FR and NFR participant data for storage in a participant database 81. In aspects, the participant profile module 80 infers skills or expertise from apps located in a device of a participant, participant calendar data, and/or device location routing data. In embodiments, the task coordination server 60 includes an emergency information module 82 configured to gather and store information associated with the emergency (e.g., on-site sensor data, building blueprints, etc.). In aspects, the task coordination server 60 includes an action coordination module 83 configured to generate emergency response tasks associated with an emergency and assign select participants to each of the tasks. In embodiments, the action coordination module 83 assigns tasks based on information in the participant database 81 and emergency action rules stored in an emergency action database 84. In aspects the task coordination server 60 also includes a communication module 85 configured to communicate emergency coordination information, including the assigned tasks, to and from one or more participant devices and/or on-site servers 78 in real-time.

In embodiments, the task coordination server 60 is configured to send and receive data to and from the NFR devices 70 and FR devices 72 within the system 50. More specifically, in aspects the task coordination server 60 is configured to send notifications of an emergency to emergency modules 90, 91 of respective participant devices (70, 72). In embodiments, the task coordination server 60 is configured to receive participant location data or other participant information from the NFR devices 70 and FR devices 72 within the system 50. In aspects, the task coordination server 60 receives data from sensor modules 92 and 93 of participant devices based on sensor data gathered by one or more sensors 94, 95 of the respective participant devices (70, 72).

The task coordination server 60 may receive other data gathered by the respective participant devices (70, 72), such as image data gathered from respective cameras of devices (e.g., 96, 97), text message data, etc.

In aspects, the task coordination server 60 is configured to communicate with an emergency module 98 of an on-site server 78. Information exchanged between the task coordination server 60 and the on-site server 78 may include information from a sensor module 99 of the on-site server 78, based on information gathered by one or more on-site sensors 100 and/or on-site cameras 101.

In embodiments, the task coordination server 60 is configured to communicate with the one or more agency servers 76 through communication modules 102 of the respective agency servers 76. Such communications modules 102 may utilize conventional communications technology or may be specially configured communications modules for communicating within the system 50.

The task coordination server 60 may be configure to communication with communications modules 103 of one or more of the augmented reality devices 74. Such communications modules 103 may utilize conventional communications technology or may be specially configured communications modules for communications within the system 50. In aspects, coordination information generated by the task coordination server 60 is communicated to the one or more augmented reality devices 74, and may be saved in a database 104 of a respective augmented reality device 74.

In embodiments, the system 50 may include additional or fewer components than those shown in FIG. 2. In embodiments, separate components may be integrated into a single computing component or module. Additionally, or alternatively, a single component may be implemented as multiple computing components or modules.

Figure 3A:
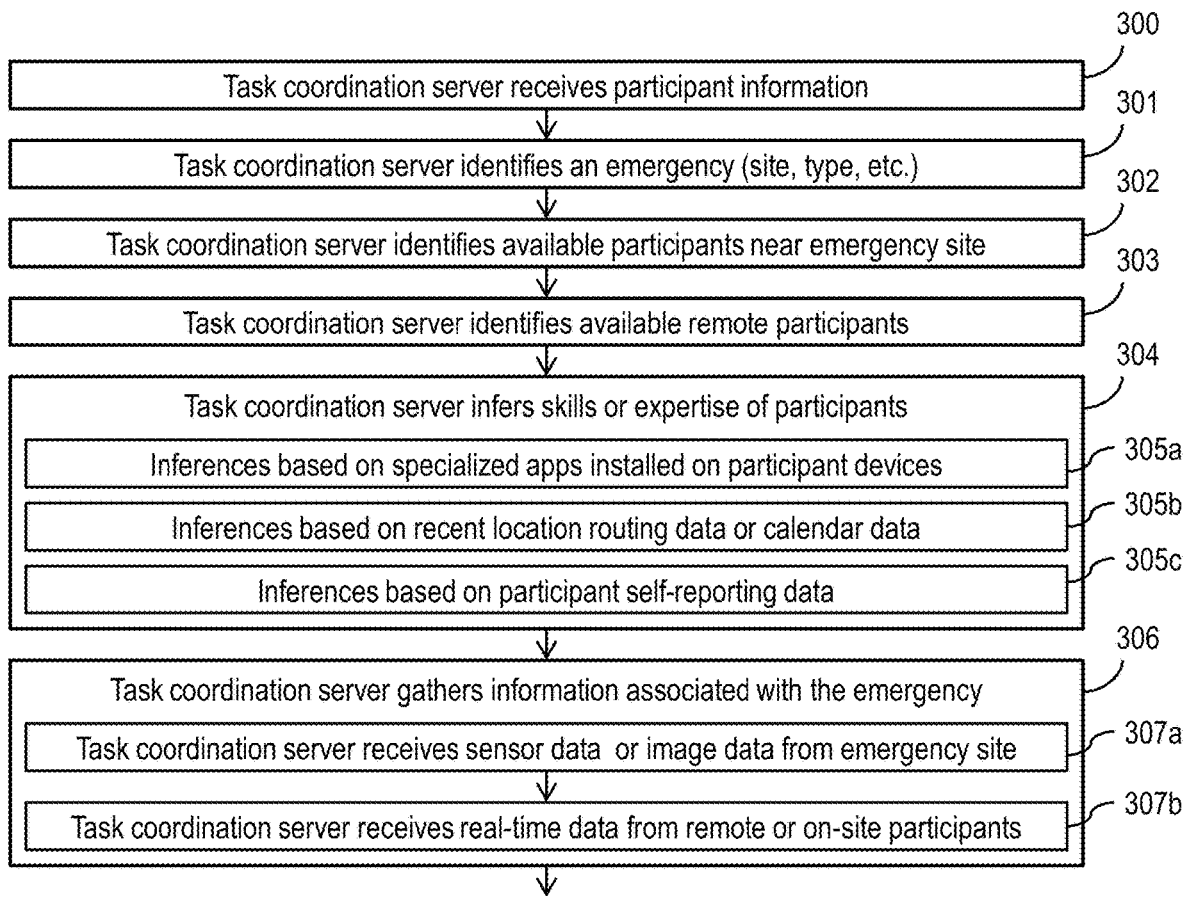
FIGS. 3A and 3B shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the task coordination server 60 receives participant information. In embodiments, the participant profile module 80 of the task coordination server 60 receives the participant information and stores the information in the participant database 81. The participant information may include information regarding FR and NFR participants. The participant information may include participant names, addresses, availability information, expertise, skills, training, associated equipment (e.g., tools, cameras, first aid kits, etc.) or any other participant information that may be useful in determining the availability and ability to appropriately assist with an emergency situation. By emergency situation it should be understood that any type of emergency may be addressed utilizing the present invention, which may include, for example, vehicular accidents, building fires, forest fires, flooding, tornadoes, and other natural or man-made emergencies. In embodiments, the task coordination server 60 receives participant information from one or more participant devices such as NFR device 70 and FR device 72. Participant information may be gathered by the task coordination server 60 through questionnaires or other conventional methods.

At step 301, the task coordination server 60 identifies an emergency. Identification of an emergency may include identifying the type of emergency, location of emergency, and severity of the emergency. In embodiments, the task coordination server 60 gathers information regarding the emergency from one or more remote sources, including but not limited to, local governmental or non-government emergency response organizations, citizens, on-site sensors, private security organizations, news services, etc. In aspects, the task coordination server 60 will receive emergency information from an agency server 76. In embodiments, the task coordination server 60 will receive emergency information directly from an on-site server 78. It should be understood that conventional methods of communication emergency information may be utilized in conjunction with step 301. In one example, a first responder dispatcher notifies the task coordination server 60 of an emergency through an agency server 76.

At step 302, the task coordination server 60 identifies available participants near the site of the emergency identified at step 301. In embodiments, the action coordination module 83 identifies available participants near the site of the emergency based on location data received from participant devices of the participants (e.g., NFR device 70, FR device 72). For example, global positioning system (GPS) technology on one or more participant devices may be utilized to determine locations of the respective devices, and GPS location data from the participant device(s) can be received by the task coordination server 60. In embodiments, the task coordination server 60 sends a notification (e.g., notification of an emergency) to an emergency module (e.g., 90, 91) of one or more participant devices (e.g., 70, 72), and may receive in return location data of the respective participant devices. In this example, the task coordination server 60 can determine which participant devices (e.g., 70, 72) are within a predetermine threshold distance from an emergency. In aspects, the task coordination server 60 utilizes rules from the emergency action database 84 to determine the threshold distance which is appropriate for a given emergency condition. For example, the task coordination server 60 may determine that participant devices within a 1 mile radius of an emergency in a busy city at rush hour are "available" for the purpose of participating in a coordinated emergency response effort.

It should be understood that other methods of ascertaining availability of participants may be utilized in performing step 302. By way of example, electronic calendars of participants may be authorized to communicate with the task coordination server 60 to enable the task coordination server 60 to ascertain availability of a participant based on electronic calendar data retrieved from the electronic calendar. In another example, the task coordination server 60 may send out a request for availability to one or more participant devices (e.g., 70, 72), and may determine the availability of one or more participants based on a received response to the request. In aspects, stored data within the participant database 81 may be utilized by the task coordination server 60 in determining availability of one or more participants. It should be understood that step 302 can apply to NFR participants and FR participants alike, and may use different methods depending on the type of participant. For example, the task coordination server 60 may determine FR participant who are available near an emergency site based, in part, on communications with one or more agency servers 76 (e.g., communications from a fire station or the like). The methods of performing step 302 are not intended to be limited to the examples set forth above.

At step 303, the task coordination server 60 identifies available remote participants. As used herein the term remote participants refers to participants who are not available to travel to the site of an emergency, but may participate in a remote coordination effort remotely. In embodiments, the action coordination module 83 of the task coordination server 60 identifies available NFR participants and/or FR participants who are remote from the site of the emergency but are available to participant in a coordinated emergency response effort. In embodiments, the task coordination server 60 sends a notification (e.g., notification of an emergency) to an emergency module (e.g., 90, 91) of one or more remote participant devices (e.g., 70, 72), and may receive in return an indication that the participant is available or not available. In embodiments, the task coordination server 60 sends notifications of an emergency only to participants who have been determined to be an expert in a field that is of use in a particular emergency response effort based on information stored in the participant database 81. For example, a participant may be listed in the participant database 81 as being a civilian expert on forest fires. In this example, in the case of a forest fire, the task coordination server 60 sends a notification to the participant requesting availability to participant in a coordinated emergency response effort through the system 50. The task coordination server 60 may then receive a response to the request for availability from the participant's device (e.g., 70, 72) and determine availability of the participant based on the received response.

It should be understood that other methods of ascertaining availability of participants may be utilized in performing step 303. By way of example, electronic calendars of remote participants may be authorized to communicate with the task coordination server 60 to enable the task coordination server 60 to ascertain availability of a remote participant based on electronic calendar data retrieved from the electronic calendar. It should be understood that step 303 can apply to NFR participants and FR participants alike, and may use different methods depending on the type of participant. For example, the task coordination server 60 may determine which remote FR participants are available based, in part, on communications with one or more agency servers 76 (e.g., Federal Emergency Management Agency (FEMA) server, etc.). The methods of performing step 303 are not intended to be limited to the examples set forth above.

At step 304, the task coordination server 60 infers skills or expertise of participants. In embodiments, the participant profile module 80 of the task coordination server 60 infers skills or expertise of participants based on data received from one or more devices of participants (e.g., 70, 72). In embodiments, the task coordination server 60 performs step 304 only for participants who have been deemed available by the task coordination server 60 at steps 302 or 303. In other embodiments, step 304 may be performed before the implementation of any of steps 301, 302 or 303. In aspects, the task coordination server 60 performs step 304 on a continuous or periodic basis, such that the participant data within the participant database 81 is continuously or periodically updated. As used herein the term infer refers to computer-based deducing or concluding information from evidence and reasoning other than explicit statements. Although explicit statements or other explicit information may be utilized by the task coordination server 60 in building participant profiles, it should be understood that cognitive processing of participant information from a plurality of sources is utilized in embodiments of the invention to infer skills or expertise that would not otherwise be known. For example, the task coordination server 60 may utilize one or more of the following substeps 305a-305d to infer participants' skills or expertise of both NFR participants and FR participants.

At substep 305a, the task coordination server 60 infers skills or expertise of participants based on one or more apps installed on one or more devices of the participant (e.g., 70, 72). By way of example, the participant profile module 80 of the task coordination server 60 may be authorized by a participant to query a NFR device 70 to determine the apps that are located on the NFR device 70, determine subject matter related to the apps, and infer, based on the subject matter, skills or expertise which may be associated with the participant (e.g., based on an inference that the participant utilizes the apps). In one exemplary scenario, an NFR device 70 includes a cardiopulmonary resuscitation (CPR) and first aid app. The participant profile module 80 may detect the presence of the CPR and first aid app on the NFR device 70, and may then determine (e.g., based on a local or remote look-up database of apps) that the CPR and first aid app relates to the subject matter of CPR and first aid. In this scenario, the task coordination server 60 infers that the participant is likely to have skills in basic CPR and first aid based on the presence of the app on the NFR device 70. In another example, the participant profile module 80 detects the presence of an app to convert energy units from one form to another and an app for computing distances on a NFR device 70, and the task coordination server 60 infers that the participant owner of the NFR device 70 may be involved with construction work. Other examples of apps that may indicate specialized skills or expertise useful in an emergency situation include apps for scouting and scientific apps. The task coordination server 60 may then save any inferred skills or expertise information in the participant database 81. It should be understood that various rules and conditions may be utilized by the task coordination server 60 in assigning type and degree of skills or expertise to a participant based on the one or more apps present on a participant device (70, 72).

At substep 305*b*, the task coordination server 60 infers skills or expertise of one or more participants based on recent location routing data or calendar data. For example, the participant profile module 80 of the task coordination server 60 may be authorized by one or more participants to track routing data of one or more participant devices (e.g., 70, 72), and utilize the routing data to infer skills or expertise of participants. In embodiments, the participant profile module 80 obtains continuous or periodic calendar updates from electronic calendars of one or more participants who have authorized access to their calendar data, and infers skills or expertise of the associated one or more participants. In an exemplary scenario, the participant profile module 80 continuously or periodically requests routing data from an NFR device 70 based on GPS location data collected by the NFR device 70. In this scenario, the participant profile module 80 recognizes that the NFR device 70 consistently travels along local rivers or other waterways, and may infer that the participant owner of the NFR device 70 likely has skills associated with driving a boat. In another example, the participant profile module 80 recognizes that the combination of routing data showing that the NFR device 70 travels along local rivers or other waterways in combination with the presence of a boating-related application on the NFR device 70, indicates that that participant owner of the NFR device 70 has basic skills associated with driving a boat. In another example task coordination server 60 obtains calendar data or routing data indicating that a participant regularly goes to a pool, and the task coordination server 60 can infer that they are likely to be able to swim. In yet another example, the task coordination server 60 may obtain calendar data or routing data indicating that a participant is taking CPR classes or has given a presentation at a Association for Computing Machinery (ACM) chapter in a room where the ACM meets monthly, and infers from this data that the participant has basic CPR and computer skills.

At substep 305*c*, the task coordination server 60 may infer the skills or expertise of one or more participants based on self-reporting data received from the one or more participants. In embodiments, the participant profile module 80 sends a data request (e.g., questionnaire) to a participant device (70, 72) requesting data associated with one or more skills or expertise that may be useful in a coordinated emergency response effort. Responses to the requests received by the participant profile module 80 may then be utilized to infer skills or expertise of participants, and the inferred skills or expertise may then be stored in the participant database 81. It should be understood that elements of substep 305*c* may be implemented in conjunction with step 300 of FIG. 3A. By way of example, the task coordination server 60 may send a questionnaire to a participant who registers with the system 50 at step 300, and the results of the questionnaire may then be processed by the task coordination server 60 to infer the skills or expertise that will be associated with the participant and stored in the participant database 81. In one exemplary scenario, a NFR participant registering with the system 50 at step 300 may indicate on a questionnaire that he or she is a retired fire fighter, and the task coordination server 60 may infer based on a set of rules stored in the participant profile module 80 that retired fire fighters are to be associated with the skills of advanced CPR and first aid training.

At step 306, the task coordination server 60 gathers information associated with the emergency identified at step 301. It should be understood that step 306 may be performed simultaneously or in conjunction with step 301. Further, step 306 may be performed continuously during an emergency event, such that the task coordination server 60 is continuously updating a database of the emergency information module 82 (not separately shown) with real-time emergency-related information, such as building information services (maps of the structures, location of exits, stairs, safe zones, heat sensors, location of victims, etc.). Various data collection methods may be utilized in the performance of step 306. For example, the methods of substeps 307*a* and 307*b* may be performed individually or together to obtain information associated with an identified emergency.

At substep 307*a*, the task coordination server 60 receives sensor data and/or image data from one or more on-site servers 78. In aspects, the emergency information module 82 of the task coordination server 60 receives real-time sensor data from one or more on-site sensors 100 and/or real-time image data from one or more cameras 101, which convey information about the site of the emergency. The task coordination server 60 may read sensor data and or camera/image data at the emergency site to determine locations of living entities (e.g., people, pets), locations of dangerous individuals who pose a threat, and/or localized emergency conditions such as fire, flooding, unsafe structural areas, etc. By way of example, fire sensors within a building may send information to a sensor module 99 of an on-site server 78 at the site of a building fire, which is then conveyed to the emergency information module 82. In this way, the task coordination server 60 may receive information regarding the exact location of a fire as it spreads throughout the building in real-time.

At substep 307*b*, the task coordination server receives real-time data from remote or on-site participants through one or more participant devices (70, 72). In embodiments, the emergency information module 82 of the task coordination server 60 receives real-time sensor data from one or more participant device sensors (e.g., 94, 95) which convey information about the site of the emergency and/or participants at the site of the emergency. For example, a FR device 72 may be a specialized communication device including IoT temperature sensors for determining ambient temperature at the FR device 72. In another example, a FR device 72 may be a specialized communication device including one or more physiological sensors capable of sensing one or more parameters related to the health and/or wellbeing of a participant, such as a heart rate monitor or the like. In aspects, the emergency information module 82 of the task coordination server 60 receives real-time image data from one or more participant device cameras (e.g., 96, 87) which convey information about the site of the emergency and/or participants at the site of the emergency. For example, images from the camera 96 of an NFR device 70 may be received at an emergency information module 82, and may convey information regarding the state of an emergency (e.g., extent of flooding, severity of fire, building damage, number of people at the site of the emergency, etc.). In aspects, the emergency information module 82 stores data related to the site of the emergency in the emergency action database 84 for use by the action coordination module 83. In aspects, information regarding the emergency can be obtained by the task coordination server 60 from one or more participant devices (70, 72) that are remote from the emergency, such as information from remote participants identified at step 303. For example, an expert on forest fires may provide the task coordination server 60 with useful information regarding how to best respond to a forest fire that is identified at step 301. Thus, it can be understood that the task coordination server 60 may utilize information from both on-site sources and off-site sources.

Figure 3B:
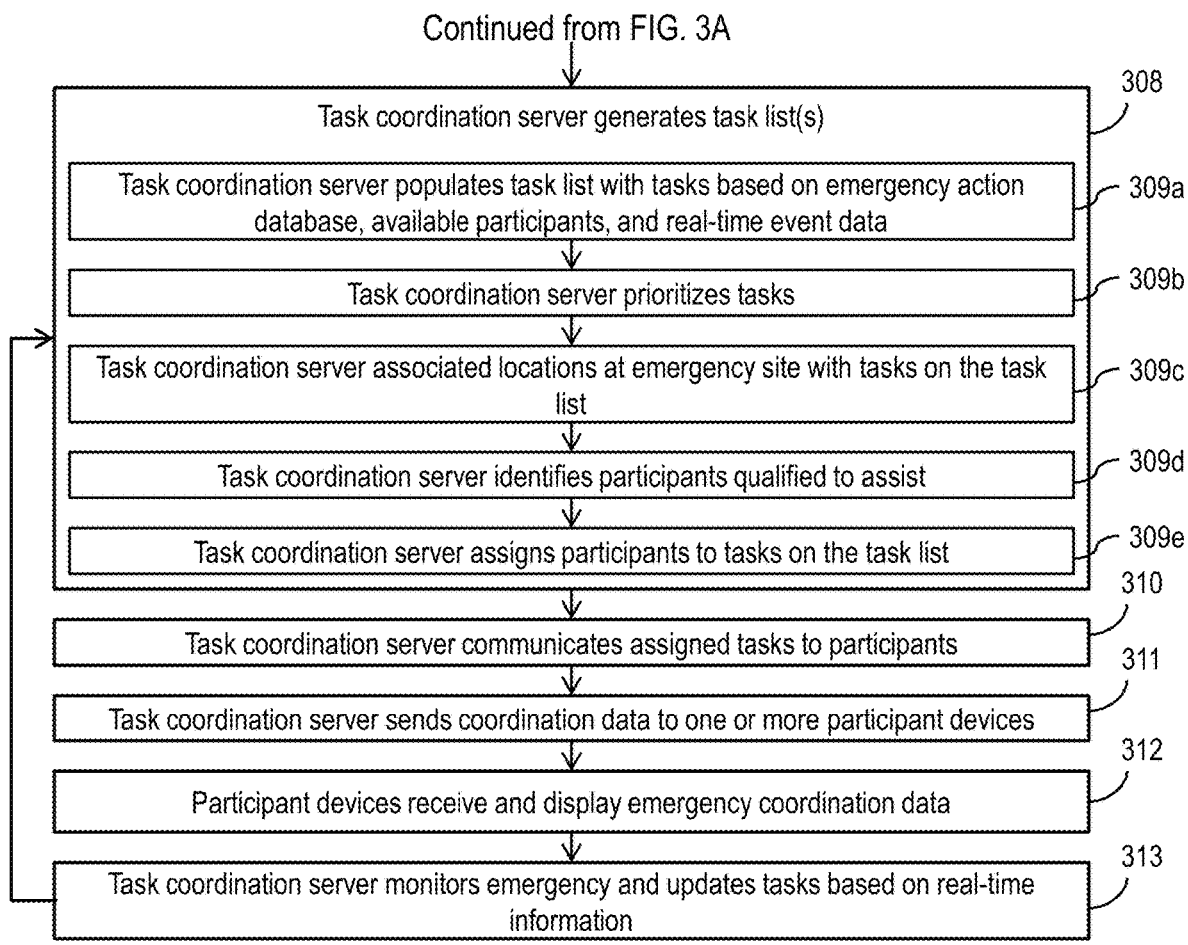

Turning to FIG. 3B, at step 308, the task coordination server 60 generates one or more task lists in response to the emergency identified at 301 including a plurality of tasks to be performed at the site of the emergency or elsewhere as part of a coordination emergency response effort. In embodiments, the action coordination module 83 generates a task list based on: the emergency identified at step 301, the available participants identified at steps 302 and 303, participant information stored in the participant database, and information gathered by the emergency information module 82 in accordance with step 306. Various task generating methods may be utilized in the performance of step 308. For example, the methods of substeps 309a-309e may be performed individually or together to generate one or more task lists.

At substep 309a, the task coordination server 60 populates a task list with tasks based on rules and instructions in the emergency action database 84, available participants and real-time event data. Emergency data stored in the emergency action database 84 may include, for example, roles by type of emergency, equipment required by tasks according to building structure or area organization, and the like. As an example, the task coordination server 60 may determine a list of tasks to be performed and associated equipment necessary for a flooding emergency in a neighborhood based on predetermined tasks associated with flooding stored in the emergency action database 84. The predetermined tasks may be filtered by the task coordination server 60 to produce a filtered list of tasks based on the skills and expertise of available on and off-site participants, as well as real-time event data gathered in accordance with step 306. By way of example, the task coordination server 60 may filter a list of predetermined tasks associated with a flooding event based on available evacuation boats near an emergency flooding event, the number of people to be evacuated, the ambient temperature and temperature of the water, available participants with skills or expertise useful in responding to a flooding emergency, and other information relevant to the determination of tasks. The task coordination server 60 may define teams, location of teams, assistance required, maps, sequences of action and more for generation of a list of tasks.

At substep 309b, the task coordination server 60 prioritizes the tasks generated at substep 309a. In embodiments, the action coordination module 83 of the task coordination server 60 prioritizes tasks in a task list based on rules in a rules database and/or manual input, such as from a remote expert or the like. For example, in the case of a flooding event, a remote expert device (e.g., 70, 72) may receive a task list generated at substep 309a that has been prioritized according to stored rules in the emergency action database 84, priority may be reassigned by an expert as deemed necessary based on their expertise, and the updated prioritized task list may be sent back to the task coordination server 60.

At substep 309c, the task coordination server 60 associates locations at or near the emergency site with tasks on the task list generated at substep 309a or the prioritized task list generated at substep 309b. For example, a task for evacuating victims of a flooding event may locate the start of the task at a temporary docking station for emergency boat drivers. In embodiments, the action coordination module 83 of the task coordination server 60 assigns a general or a specific location to one or more tasks on the task list of substeps 309a or 309b.

At substep 309d, the task coordination server 60 identifies participants who are qualified to assist with one or more tasks on the task list. In embodiments, the action coordination module 83 of the task coordination server 60 identifies NFR and FR participants who are determined by the task coordination server 60 to be qualified based on their availability and information stored in the participant database 81 (e.g., skills and expertise). In aspects, the skills and expertise derived at step 304 are utilized by the task coordination server 60 to determine which NFR participants at the site of an emergency have the skills or expertise to perform one or more of the tasks on the task list.

At substep 309e, the task coordination server 60 assigns participants to tasks on the task list. In embodiments, the action coordination module 83 of the task coordination server 60 assigns NFR and/or FR participants to one or more tasks based on the identification of qualified participants at substep 309d. The assignment of tasks by the task coordination server 60 may be performed automatically based on rules. In embodiments, the task coordination server 60 enables a user to edit the assignment of tasks either remotely or through a user interface of the task coordination server 60. In embodiments, the task coordination server 60 utilizes participant profile information from the participant database 81 and location information regarding the current location of participants to determine required tasks/actions and assign them to the nearest most suitable and available participant.

At step 310, the task coordination server 60 communicates the assignment of tasks determined at step 309e to one or more participant devices (70, 72) or augmented reality devices 74. In embodiments, the action coordination module 83 of the task coordination server 60 sends task assignments to one or more participant devices (70, 72) and/or augmented reality devices 74 through the network 55.

At step 311, the task coordination server 60 sends coordination data to one or more participant device 70, 72 or augmented reality devices 74. In aspects, steps 310 and 311 are performed simultaneously. In embodiments, the action coordination module 83 of the task coordination server 60 sends coordination data related to respective tasks to one or more participant devices (70, 72) or augmented reality devices 74. Coordination data may be any type of data that assists a participant in performing one or more of the tasks assigned to them.

At step 312, one or more participant devices (70, 72) receive task assignments and/or coordination data sent according to steps 309 and 310 and display emergency coordination data (including task assignments and/or coordination data) to respective participants through a display of the respective one or more participant devices. By way of example, coordination data may be in the form of a real-time map of fire as it spreads through a building. In this scenario, the map may be sent to an augmented reality device 74 of a FR participant firefighter to be displayed to the firefighter to aid him/her in the task of evacuating people from the building. In another example, coordination data may be in the form of a plurality of images, streaming videos or other real-time data sent to a remote participant device (70, 72) to be displayed to a remote expert to assist the remote expert in providing guidance to participants at the location of the emergency through communication with the task coordination server 60.

At step 313, the task coordination server 60 continuously monitors an emergency and updates tasks based on real-time information received. In embodiments, the action coordination module 83 continually monitors incoming sensor data, incoming status data regarding the status of tasks, and incoming resources data (participant resources, emergency vehicles, etc.), and assigns new tasks and/or additional FR participants or NFR participants as needed and/or as they become available. For example, the task coordination server 60 may receive real-time data regarding the spreading of a fire from on-site fire sensors 100, and may update the task list to reflect a new priority for evacuating people from a certain portion of the building first, while assigning newly available NFR participants to evacuation stations at a distance from the burning building.

Figure 4:
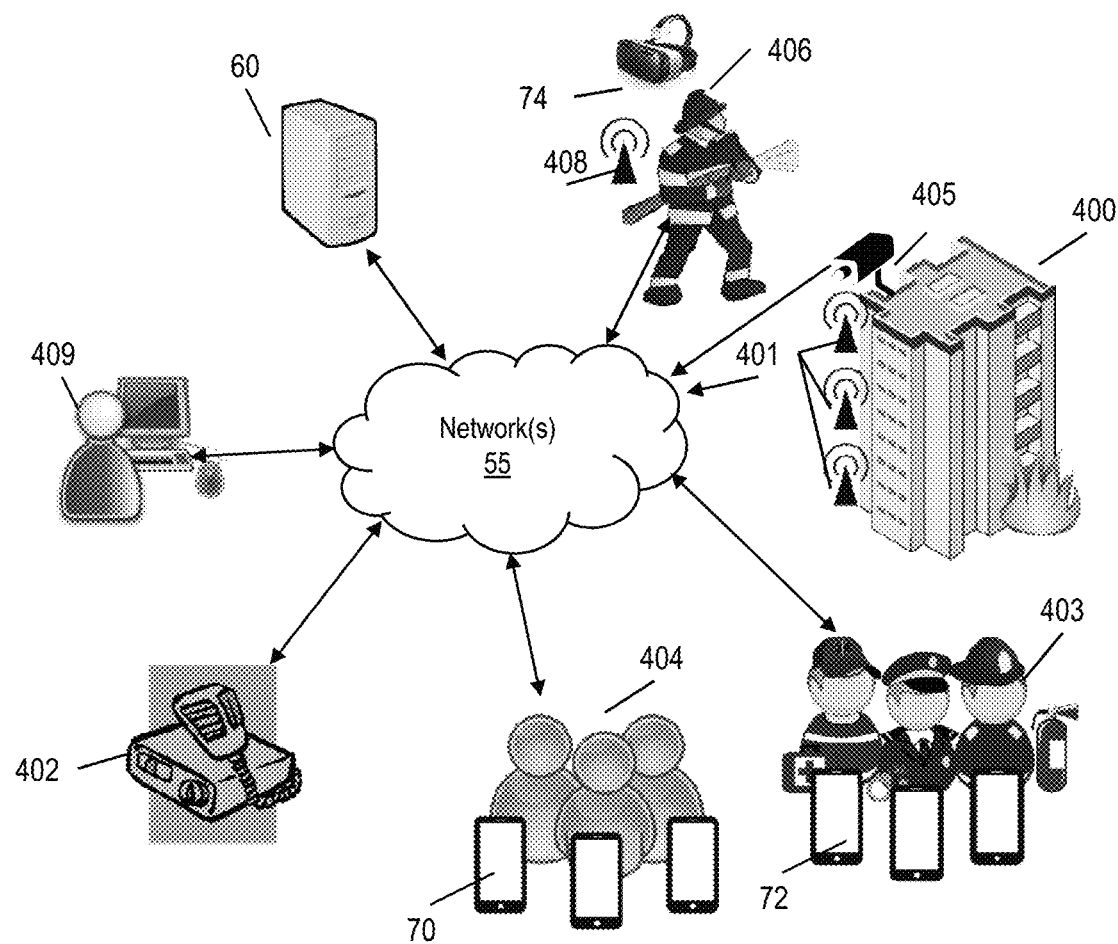
FIG. 4 depicts a use scenario in accordance with embodiments of the invention.

FIG. 4 illustrates an exemplary use scenario wherein the system 50 is utilized in coordinating an emergency response effort for a building fire. In the scenario depicted, a building 400 is on fire, the building 400 including on-site IoT sensors 401. An alarm is triggered by an emergency module 98 (not shown in FIG. 4) at the building 400, and an emergency dispatcher 402 receives the alarm information from the emergency module 98 through the network 55. The emergency dispatcher 402 sends emergency information to one or more FR participants indicated at 403, and to the task coordination server 60 through the network 55. The FR participants 403 proceed to the scene of the fire. The task coordination server 60 identifies the type of emergency based on the emergency information sent from the emergency dispatcher 402 in accordance with step 301 of FIG. 3A, and identifies NFR participants 404 within a predetermined threshold distance from the building 400 in accordance with step 302 of FIG. 3. The task coordination server 60 retrieves information regarding the type of apps utilized by the NFR devices 70 of the NFR participants 404, calendar data, and recent location routing data, and infers skills or expertise of the NFR participants 404 based on the information in accordance with step 304 of FIG. 3A. The task coordination server 60 also gathers information associated with the fire by: obtaining data from the building IoT sensors 401 to determine fire location; retrieving building schematics to determine exit doors; and retrieving building personnel data from an on-site server 78 (not depicted in FIG. 4) and image data from a security system 405 of the building 400 to determine the location and number of people within the building 400 in accordance with step 306 of FIG. 3. The task coordination server 60 generates a task list and sends the tasks and associated coordination data to the FR devices 72 to provide the FR participants with required actions to take and associated locations within and outside the building 400 in accordance with steps 308-311. In this scenario, the task of "evacuation" is sent to most of the FR participants 403, while the task of "exterior visual assessment" is sent to the NFR participants 404 and one supervising FR participant 403. Next, firefighters 406 arrive at the building 400, and a communication from an FR device 72 to the task coordination server 60 alerts the task coordination server 60 to the change in on-site personnel in real-time in accordance with 306. The task coordination server 60 then determines the skills and expertise of the firefighters 406 and updates the task list to accommodate the additional participants at the emergency site in accordance with step 313 of FIG. 3.

In the scenario of FIG. 4, firefighters 406 are equipped with one or more physiological sensors 408 configured to monitor their health and well being. The task coordination server 60 receives real-time sensor data from the sensors 408, and determines that one or more of the firefighters 406 has an impaired status (e.g., excessive heart rate detected, etc.), and updates the emergency related information to reflect this fact in accordance with step 306 of FIG. 3A and re-assign tasks accordingly in accordance with step 314 of FIG. 3B. The task coordination server 60 also receives a request for additional assistance from a FR participant 403, at which point the task coordination server 60 identifies a remote available participant 409 who is an expert in building fires, to assist in the coordination emergency response effort in accordance with step 303 of FIG. 3A. The task coordination server 60 assigns one or more tasks to the remote participant via the network 55 and receives expert advice from the remote participant 409, which the task coordination server 60 passes on to the FR participants 403 and firefighter 406 in the form of updated emergency coordination data in accordance with step 311 of FIG. 3B.

In the scenario of FIG. 4, sensor signals from the on-site IoT sensors 401 indicate to the task coordination server 60 that an automatic fire door in the building 400 has malfunctioned, leaving a portion of the building more vulnerable to fire. The task coordination server 60 updates the task list to include a task to fix the malfunctioning fire door and secure the area around the malfunctioning fire door, in accordance with step 313 of FIG. 3B. Emergency coordination data in the form of a map of the building 400 is updated by the task coordination server 60 to indicate the broken fire door as well as the current location of people and fire, and is sent to an augmented reality device 74 of a first responder firefighter 406 in accordance with step 310 of FIG. 3B to assist the firefighter in visualizing emergency data which would otherwise not be available to him or her. Additionally, the task coordination server 60 dispatches a task notification to a NFR device 70 of a NFR participant 404 that has been identified as a doctor's assistant, to assist with evacuating individuals to safety. The system 50 also detects an individual with low vision in the north sector of the building 400 and delays a task of disconnecting the electricity for that sector until the task coordination server 60 receiving information indicating that individual has been moved to safety.

Based on the above, it should be understood that embodiments of the present invention enable: detection of nearby volunteers and their skill set to augment the pool of resources that can be drawn on in an emergency: prioritization of tasks by nearest suitable first responder, thereby optimizing a sequence of necessary actions to take and reducing the amount of time and resources needed to handle an emergency situation; the connection of on-site emergency responders with remote experts, thereby enabling on-site emergency responders to benefit from recommendations of experienced participants from all over the world; and real-time updates of an emergency response coordination effort based on sensor data to provide immediate information that may not be readily observable by human participants (emergency responders).

Advantageously, the system of the present invention constitutes an improvement to electronic emergency response systems and adds the functionality of cognitive analysis of participant data to infer skills or expertise that can be utilized by the system to assign emergency response tasks to FR and NFR participants, either on-site or remote from an emergency. The present system further reducing computing overhead (i.e., consumption of computing resources) by enabling a single task coordination server 60 to receive real-time emergency data from a plurality of sources, including IoT sensors, evaluate the data, and distribute coordinated task lists and emergency coordination data to multiple participant devices at the same time. Moreover, the distribution of real-time digital data including images, sensor data and remote expert advice and/or recommendations by the computer network of the present invention enables a real-time coordinated emergency response amongst a plurality of devices and human participants.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for cognitive emergency task coordination. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

What is claimed is:

1. A computer-implemented method, comprising:
receiving, by a computing device, participant data from one or more remote participant devices;
identifying, by a computing device, one or more available participants who are available to assist with an emergency based on the participant data;
querying, by the computing device, the one or more remote participant devices to determine a presence of one or more applications located on the respective one or more remote participant devices;
determining, by the computing device, subject matter related to the one or more applications that indicate specialized skills or expertise useful in an emergency situation;
inferring, by the computing device, a type and a degree of a skill or expertise of each of the one or more available participants based on the one or more applications on the respective one or more remote participant devices and saving the inferred type and degree of the skill or expertise in a participant database;
automatically populating, by the computing device, a task list with tasks based on rules and instructions in an emergency action database, the one or more available participants, and real-time event data associated with the emergency;
assigning, by the computing device, select participants of the one or more available participants to one or more of the tasks in the task list based on the inferred skill or expertise;
sending, by the computing device, coordination data to the select participants, the coordination data including information regarding the one or more of the tasks assigned to the respective select participants;
receiving, by the computing device, real-time sensor data from one or more first responder devices indicative of a state of one or more respective first responder participants;
automatically updating, by the computing device, the task list based on the real-time sensor data;
sending, by the computing device, second coordination data in the form of real-time video data of the emergency to an augmented reality device of a remote participant enabling the remote participant to view the emergency live, wherein the augmented reality device is remote from a site of the emergency;
receiving, by the computing device, recommended actions or tasks from the remote participant while the remote participating is remote from the site of the emergency based on the real-time video data of the emergency; and
automatically updating, by the computing device, the task list based on the recommended actions or tasks received from the remote participant.

2. The method of claim 1, further comprising:
identifying, by the computing device, the emergency;
gathering, by the computing device, information associated with the emergency; and
identifying, by the computing device, the one or more available participants near a site of the emergency, the one or more available participants including first responder participants and non-first responder participants, wherein the assigning the select participants is further based on the information associated with the emergency.

3. The method of claim 2, wherein the receiving information associated with the emergency includes receiving, by the computing device, sensor data from building sensors located at the site of the emergency.

4. The method of claim 3, further comprising:
receiving, by the computing device, real-time data from the building sensors regarding the emergency; and
updating, by the computing device, the task list and assignment of the tasks based on the real-time data.

5. The method of claim 1, further comprising:
assigning, by the computing device, the remote participant to one or more of the tasks in the task list;
wherein the sending the second coordination data to the participant device of the remote participant includes sending information regarding the one or more of the tasks assigned to the remote participant.

6. The method of claim 5, further comprising:
identifying, by the computing device, available remote participants having expertise in a field related to the emergency, wherein the available remote participants are participants who are not available to travel to the site of the emergency; and
selecting, by the computing device, the remote participant from the available remote participants.

7. The method of claim 1, further comprising obtaining, by the computing device, participant registration information for the one or more available participants.

8. The method of claim 1, wherein the skill or expertise are further inferred by analyzing location routing data of the one or more remote participant devices to determine skills or expertise related to the location routing data, wherein the location routing data comprises continuously or periodically requested global positioning location data from the one or more remote participant devices.

9. A computer program product for cognitive emergency task coordination, the computer program product comprising a non-transitory computer readable storage medium having program instructions embodied therewith, the program instructions executable by a computing device to cause the computing device to:
identify an emergency;
gather information associated with the emergency in real-time during the emergency;
identify one or more available participants near a site of the emergency, the one or more available participants including first responder participants and non-first responder participants;
query the one or more remote participant devices to determine a presence of one or more software applications located on the respective one or more remote participant devices;
determine subject matter related to the one or more applications that indicate specialized skills or expertise useful in an emergency situation;
infer skills or expertise of one or more available participants based on the one or more software applications on the respective one or more remote participant devices and save the inferred skills or expertise in a participant database;
automatically populate a task list with tasks based on rules and instructions in an emergency action database, the one or more available participants, and real-time event data associated with the emergency;
assign select participants of the one or more available participants to one or more of the tasks in the task list based on the inferred skills or expertise of the select participants;
send coordination data to the select participants, the coordination data including information regarding the one or more of the tasks assigned to the respective select participants;
send second coordination data in the form of real-time video data of the emergency to an augmented reality device of a remote participant device to view the emergency live, wherein the augmented reality device is remote from a site of the emergency;
receive recommended actions or tasks from the remote participant while the remote participating is remote from the site of the emergency based on the real-time video data of the emergency;
automatically update the task list based on the recommended actions or tasks received from the remote participant;
receive sensor data from one or more first responder devices indicative of the state of one or more respective first responder participants; and
automatically update the task list based on the sensor data.

10. The computer program product of claim 9, wherein the program instructions further cause the computing device to:
receive real-time building sensor data regarding the emergency; and
update the task list and assignment of the tasks based on the real-time building sensor data.

11. The computer program product of claim 9, wherein the program instructions further cause the computing device to:
assign a remote participant to one or more of the tasks in the task list; and
send updated tasks to the select participants.

12. The computer program product of claim 11, wherein the program instructions further cause the computing device to:
identify available remote participants having expertise in a field related to the emergency; and
select the remote participant from the available remote participants.

13. The computer program product of claim 9, wherein the program instructions further cause the computing device to obtain participant registration information for the one or more available participants.

14. The computer program product of claim 9, wherein the skills or expertise are further inferred by analyzing location routing data of the one or more remote participant devices to determine skills or expertise related to the location routing data, wherein the location routing data comprises continuously or periodically requested global positioning location data from the one or more remote participant devices.

15. The computer program product of claim 9, wherein the gathering information associated with the emergency includes gathering sensor data from sensors located at the site of the emergency.

16. A system for real-time cognitive emergency task coordination, comprising:
a CPU, a computer readable memory and a non-transitory computer readable storage medium associated with a computing device;
program instructions to query one or more remote participant devices to determine a presence of one or more software applications located on the respective one or more remote participant devices;
program instructions to determine subject matter related to the one or more applications that indicate specialized skills or expertise useful in an emergency situation;
program instructions to infer expertise of participants based on the one or more software applications on the one or more remote participant devices of respective participants;

program instructions to identify available remote participants having an inferred expertise in a field related to an emergency;
program instructions to select a remote participant from the available remote participants;
program instructions to automatically populate an emergency response task list with tasks based on rules and instructions in an emergency action database, the one or more available remote participants, and real-time event data associated with the emergency;
program instructions to assign the remote participant to one or more of tasks in the emergency response task list based on the inferred expertise;
program instructions to send coordination data including real-time video data of the emergency to an augmented reality device of a remote participant device of the remote participant enabling the remote participant to view the emergency live, the coordination data further including information regarding the one or more of the tasks assigned to the remote participant, wherein the augmented reality device is remote from the site of the emergency;
program instructions to receive recommended actions or tasks from the remote participant device while the remote participating device is remote from the site of the emergency based on the real-time video data of the emergency;
program instructions to update the emergency response task list based on the recommended actions or tasks received from the remote participant; and
program instructions to send updated tasks to one or more available participants at a site of the emergency.

17. The system of claim 16, further comprising:
program instructions to generate the emergency response task list;
program instructions to assign select participants of the one or more available participants to the one or more of the tasks in the task list based on the inferred expertise; and
program instructions to send initial coordination data to the select participants, the initial coordination data including information regarding the one or more of the tasks assigned to the respective select participants.

18. The system of claim 17, wherein the expertise is further inferred by analyzing location routing data of the one or more remote participant devices to determine skills or expertise related to the location routing data, wherein the location routing data comprises continuously or periodically requested global positioning location data from the one or more remote participant devices.

19. The method of claim 1, further comprising filtering predetermined tasks based on the inferred skills or expertise of the one or more available participants and the real-time event data, wherein the tasks populating the task list are based on the filtering and the inferred skills or expertise comprise cardiopulmonary resuscitation (CPR) or first aid training.

20. The system of claim 16, further comprising program instructions to filter predetermined tasks based on the inferred expertise of the participants and the real-time event data, wherein the tasks populating the task list are based on the filtering wherein the inferred type of skill or expertise comprises a medical skill or expertise.

* * * * *